Sept. 6, 1966  AKIRA MIZUNO  3,270,728
DEVICE FOR DRIVING AUTOMOTIVE VEHICLES AT CONSTANT SPEED
Filed Dec. 17, 1963

United States Patent Office 3,270,728
Patented Sept. 6, 1966

3,270,728
DEVICE FOR DRIVING AUTOMOTIVE VEHICLES
AT CONSTANT SPEED
Akira Mizuno, 60 Shinmeicho, 7-chome,
Kariya-shi, Aichi-ken, Japan
Filed Dec. 17, 1963, Ser. No. 331,304
Claims priority, application Japan, Dec. 26, 1962,
37/58,885
7 Claims. (Cl. 123—102)

The present invention relates to a device for driving automotive vehicles at a desired constant speed.

In conventional speed regulating devices widely employed in automotive vehicles heretofore, the accelerator pedal must be manipulated by foot so as to change the opening of the throttle valve for thereby attaining the desired speed regulation. This manner of operation is inconvenient in that the accelerator pedal must be continuously forced down by foot throughout the driving.

This invention intends to obviate the drawback of the prior speed regulating devices, and has for its object to provide a novel speed regulating device which can easily be manipulated and dispenses with continual actuation of the accelerator pedal once the desired speed is set.

According to the invention, there is provided a device for driving an automotive vehicle at a desired constant speed comprising an electromagnet, a linkage for connecting said electromagnet to the operating spindle of a throttle valve controlling the speed of said automotive vehicle, a plate of ferro-magnetic material disposed opposite said electromagnet for attracting said electromagnet thereto and firmly maintaining said electromagnet at a desired shifted position when said electromagnet is energized, and means for displacing said plate in unitary relation with said electromagnet as attracted to said plate, whereby the opening of the throttle valve can be regulated as desired and the regulated opening can be invariably secured by maintaining said attracting plate at the desired secured position.

The invention is further characterized in that said means for displacing said plate includes a controlling motor in the form of an electric motor or a hydraulic motor, and switch means are operatively associated with the clutch pedal and/or the brake pedal for deenergizing said electromagnet.

There are other objects and particularities of the invention which will be obvious from the following description with reference to the accompanying drawings, in which.

Figure 1:
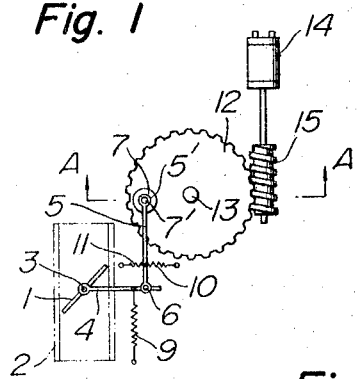
FIG. 1 is a front elevational view showing part of a throttle valve regulating mechanism for an automotive vehicle to which a device according to the invention is applied.

In FIG. 1, there is shown a portion of a throttle valve regulating mechanism for an automotive vehicle, which includes a throttle valve 1 disposed in a passage 2 for a gas mixture and firmly secured on an operating spindle 3. The passage 2 for the gas mixture shown in phantom lines is ordinarily formed as a Venturi tube. The operating spindle 3 is supported in place in the gas passage 2 by being fitted in opposed holes bored in the gas passage 2 as in the case of conventional carburetors. One end of a throttle lever 4 is firmly secured to the operating spindle 3, while the other end of the throttle lever 4 is connected to the lower end of a link 5 by means of a pin 6. The upper end 5' of the link 5 is loosely fitted on a pin 7' protruding from an electromagnet 7. A retainer 8 is fitted on the pin 7' so as to retain the electromagnet 7 in place on the link 5. In order to normally urge the throttle valve 1 in the closing direction, a spring 9 is fitted at one end thereof to the throttle lever 4. The link 5 is urged in opposite directions by springs 10 and 11 so that the link 5 can be stably held at the position at which the electromagnet 7 is disposed opposite the periphery of the attracting plate 12 when the electromagnet 7 is in its deenergized state. According to the embodiment shown, the attracting plate 12 takes the form of a worm wheel made of a ferromagnetic material. The worm wheel 12 is loosely mounted on a stationary shaft 13 so as to be rotatable thereabout and is in meshing engagement with a worm 15 which is driven by a controlling motor 14.

Figure 2:
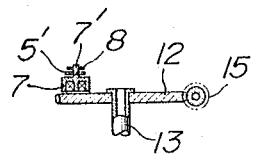
FIG. 2 is a sectional view taken on the line A—A of FIG. 1.

In FIG. 2 showing a cross-sectional view taken along the line A—A of FIG. 1, there is shown the relation between the attracting plate 12 and the electromagnet 7 when the latter is in its deenergized state. It will be seen that the electromagnet 7 is disposed adjacent the surface of the attracting plate 12. It will be understood that, when energized, the electromagnet 7 will be attracted onto the attracting plate 12 and will continue to be displaced or secured in place in unitary relation therewith. When deenergized, the electromagnet 7 is urged downwardly in the direction to close the throttle valve 1 by the force of the spring 9.

Figure 3:
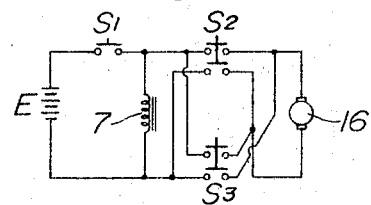
FIG. 3 is an electrical circuit diagram for actuating the controlling electric motor in the regulating mechanism shown in FIGS. 1 and 2.

In the electrical circuit diagram shown in FIG. 3, and electric motor 16 is used as the controlling motor 14 to operate the regulating mechanism shown in FIGS. 1 and 2. Three switches $S_1$, $S_2$ and $S_3$ are used to control the opening of the throttle valve 1, wherein the switch $S_1$ is used to energize the electromagnet 7, and the switches $S_2$ and $S_3$ are used to effect normal and reverse rotation of the motor 16.

When the switch $S_1$ is thrown in, the voltage of a battery E is impressed on the winding of the electromagnet 7 to energize the same. The electromagnet 7 therefore is attracted to the surface of the attracting plate 12. When, successively, the switch $S_2$ is pushed down, the electric motor 16 makes the normal rotation to drive the attracting plate 12, say, clockwise in FIG. 1. The electromagnet 7 is thereby moved upwardly in unitary relation with the attracting plate 12 to urge the throttle valve 1 in the opening direction. The upward movement of the electromagnet 7 is continued while the switch $S_2$ is actuated, and the speed of the automotive vehicle is gradually increased. When the desired speed is reached, the switch $S_2$ may be released by hand. The motor 16 is thereby stopped at the position to maintain the throttle valve 1 at the opening as effected by the above operation, so that the vehicle continues to run at an approximately constant speed. The switch $S_2$ may further be actuated for a short time when it is desired to slightly increase the speed so obtained. When, on the contrary, it is desired to gradually decrease the speed, the switch $S_3$ is actuated. Actuation of the switch $S_3$ makes the motor 16 to rotate in the reverse direction, and the attracting plate 12 is urged in the opposite direction or counter-clockwise so that the electromagnet 7 is moved downwardly in the direction in which the throttle valve 1 is closed. The switch $S_1$ may be opened when quick deceleration is desired. The electromagnet 7 is thereby deenergized and disengaged from the attracting plate 12 to instantaneously close the throttle valve 1, and the speed of the vehicle can be quickly slowed down.

Figure 4:
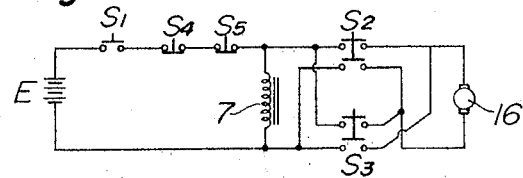
FIG. 4 is an electrical circuit diagram similar to FIG. 3, but further including switches adapted to be actuated by both the brake pedal and the clutch pedal.

In the electrical circuit diagram shown in FIG. 4, two normally closed switches $S_4$ and $S_5$ are additionally provided in the circuit in FIG. 3 in series with the switch $S_1$. The switches $S_4$ and $S_5$ are operable in cooperation with a clutch pedal and a brake pedal, respectively. Connections are made in a manner that manipulation of the pedals opens the respective switches to deenergize the electromagnet 7. By the provision of such switches $S_4$ and $S_5$, the electromagnet 7 is deenergized to automatically shut off the throttle valve whenever either the clutch pedal or the brake pedal is manipulated. This arrangement will very conveniently work in the case wherein the change gear is changed over or the brake is quickly applied.

Figure 5:
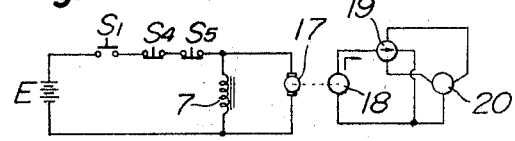
FIG. 5 is a diagram of an electrical and hydraulic loop when a hydraulic motor is employed in the regulating mechanism shown in FIGS. 1 and 2.

In the diagram of an electrical and hydraulic loop shown in FIG. 5, a hydraulic motor 20 is used in place of the electric motor 16 in FIG. 4. In this arrangement actuation of the switch $S_1$ will urge the electromagnet 7 to be attracted to the attracting plate 12, and at the same time an electric motor 17 connected to a hydraulic pump 18 such as a gear pump starts rotation to discharge a fluid into the hydraulic loop. A three-way valve 19 is interposed in the hydraulic system between the hydraulic pump 18 and the hydraulic motor 20 so that, when manipulated, it is operative to rotate the hydraulic motor 20 in the normal or reverse direction or to effect stoppage of the motor 20. The attracting plate 12 in FIG. 1 can thereby be rotated in the normal or reverse direction or stopped.

From the foregoing description, it will be understood that, according to the invention, there is no need of continually forcing down the accelerator pedal for maintaining the throttle valve at some desired opening. No manipulation of the throttle valve regulating mechanism by hand or foot will be necessary when the vehicle is to be run at a desired constant speed, and this will provide ease of driving. Since the only thing to be done is a short-time manipulation of the switches or the fluid valve, manual control of the throttle valve can be effected relatively easily. For example, the switches $S_2$ and $S_3$ as shown in FIG. 3 or 4 may be disposed at the handle. With the device of the invention employing the electric motor as the control motor, a further advantage will be derived in that the entire device can be manufactured at low cost since the mere manipulation of the switches permits desired speed regulation. An advantage derivable from the device utilizing the hydraulic motor resides in its ability of providing quick speed change since the time constant of the hydraulic motor can easily be made smaller than in the case of the device with the electric motor. Further, provision of the switch at the clutch pedal or brake pedal will be effective to automatically shut off the throttle valve when the clutch is disengaged or the brake is applied, and this will insure reliable and easy driving and will be effective for preventing any danger from occurring .

In the embodiment of the invention illustrated in FIGS. 1 and 2, the worm wheel 12 has been utilized as the attracting plate, but it will be understood that such attracting plate may be separately provided. In FIG. 5, the three-way valve 19 has been utilized to control the hydraulic motor 20, but the valve may be of electromagnetically actuated type and a switch may be provided to operate the same.

What is claimed is:

1. Apparatus for driving an automobile vehicle at a selected speed, which comprises a throttle valve for controlling the speed of said automotive vehicle, an electromagnet, means to selectively energize said electromagnet, a plate of ferromagnetic material having a rest position when the electromagnet is deenergized adjacent to and out of contact with said electromagnet and mounted for displacement in either of two opposite directions, said electromagnetic being mounted for displacement from said rest position to a position of contact with said plate when said electromagnet is energized and from said position of contact back to said rest position when said electromagnet is deenergized, said electromagnet being held in fixed relation to said plate when said electromagnet is in an energized state, a linkage directly and continuously connecting said electromagnet both when in said energized state and when in a deenergized state to said throttle valve, and means to selectively displace said plate together with said electromagnet when said electromagnet is in said energized state to move said plate together with said electromagnet to operate said linkage and thereby change the opening of said throttle valve.

2. Apparatus according to claim 1, in which said plate is circular and is mounted for rotation about its center.

3. Apparatus according to claim 2, in which said plate-displacing means comprises a worm wheel fixedly associated with said plate, a worm in meshing engagement with said worm wheel, and a motor for selectively rotating said worm in either direction.

4. Apparatus according to claim 3, in which said motor comprises an electrically operated motor.

5. Apparatus according to claim 3, in which said motor comprises a hydraulically operated motor.

6. Apparatus according to claim 1, which includes an independently operated switch means for de-energizing said electromagnet.

7. Apparatus according to claim 4, which includes electric circuit means for transmitting current to the electric motor, said circuit means including switch means for reversing the direction of current flow through the electric motor thereby to reverse the operating direction of said motor.

References Cited by the Examiner

UNITED STATES PATENTS

| | | | |
|---|---|---|---|
| 2,911,077 | 11/1959 | Carter | 192—3 |
| 2,987,054 | 6/1961 | Eddy | 123—102 |
| 3,028,939 | 4/1962 | Glick | 180—82.1 X |

MARK NEWMAN, *Primary Examiner.*

DAVID J. WILLIAMOWSKY, *Examiner.*

L. M. GOODRIDGE, *Assistant Examiner.*